(12) United States Patent  (10) Patent No.: US 8,255,302 B2
Chen  (45) Date of Patent: Aug. 28, 2012

(54) SYSTEM AND METHODS FOR MODELING A MULTIPLICATIVE INDEX

(75) Inventor: Mike Chen, New York, NY (US)

(73) Assignee: Morgan Stanley, New York, NY (US)

( * ) Notice: Subject to any disclaimer, the term of this patent is extended or adjusted under 35 U.S.C. 154(b) by 678 days.

(21) Appl. No.: 12/082,280

(22) Filed: Apr. 10, 2008

(65) Prior Publication Data

US 2009/0222385 A1 Sep. 3, 2009

Related U.S. Application Data

(60) Provisional application No. 61/032,309, filed on Feb. 28, 2008.

(51) Int. Cl.
  *G06F 35/00* (2006.01)
(52) U.S. Cl. ........................................................ 705/35
(58) Field of Classification Search ............... 705/35–45
  See application file for complete search history.

(56) References Cited

U.S. PATENT DOCUMENTS

| | | | |
|---|---|---|---|
| 6,856,973 | B1 | 2/2005 | Bott |
| 7,340,427 | B1 | 3/2008 | Cornell |
| 7,376,604 | B1 | 5/2008 | Butcher |
| 7,451,105 | B1 | 11/2008 | Doyle |
| 7,533,049 | B2 | 5/2009 | Sato |
| 7,571,136 | B2 | 8/2009 | May |
| 7,620,578 | B1 | 11/2009 | Belton et al. |
| 7,689,497 | B2 | 3/2010 | May |
| 7,996,296 | B2 | 8/2011 | Lange |
| 2002/0111891 | A1 | 8/2002 | Hoffman et al. |
| 2003/0028462 | A1 | 2/2003 | Fuhrman et al. |
| 2004/0111358 | A1 | 6/2004 | Lange et al. |
| 2004/0225598 | A1 | 11/2004 | Goldberg et al. |
| 2005/0086152 | A1 | 4/2005 | Sweeting |
| 2005/0097029 | A1 | 5/2005 | Cooper |
| 2005/0114260 | A1 | 5/2005 | Gula, IV |
| 2005/0131796 | A1 | 6/2005 | Bridges et al. |
| 2005/0216384 | A1 | 9/2005 | Partlow et al. |
| 2006/0053073 | A1 | 3/2006 | Marlowe-Noren |
| 2006/0143099 | A1 | 6/2006 | Partlow et al. |
| 2006/0229955 | A1 | 10/2006 | Ono et al. |
| 2007/0130041 | A1* | 6/2007 | Strela et al. ................ 705/36 R |
| 2007/0156555 | A1* | 7/2007 | Orr .................................. 705/35 |
| 2008/0177673 | A1* | 7/2008 | Ahn et al. ................... 705/36 R |

OTHER PUBLICATIONS

Claudio ALbanese & Manlio Trovatro, "A Stochastic Monetary Policy interest Rate Model", May 3, 2007, pp. 1-26.*
Yvette Shields, "Testing the Swap Waters: Illinois Plans $600M Floating-to-Fixed-Rate Deal," The Bond Buyer, v. 346, n. 3174, p. 1, Oct. 22, 2003.
Peter Block, et al. "Public Finance Criterial: Debt Derivative profiles,"Standard & Poor's, Sep. 29, 2004.

(Continued)

*Primary Examiner* — Thu-Thao Havan
*Assistant Examiner* — Jennifer Liu
(74) *Attorney, Agent, or Firm* — K&L Gates LLP

(57) ABSTRACT

Computer-implemented methods for valuing a derivative based on the BMA rate: the methods may comprise generating a model of the BMA/LIBOR ratio as a function of the LIBOR index, a stochastic noise function, and a seasonality process. The methods may also comprise solving the model for at least one value of the LIBOR index, and estimating a value of the derivative given the solution of the model. The value of the derivative may then be stored.

30 Claims, 6 Drawing Sheets

OTHER PUBLICATIONS

Robert Brooks, "Urban Finance and the Cost of Tax Policy Uncertainty: Evidence from the Municipal Swap Market," Working Paper No. 01-01-01, Department of Economics, Finance and Legal Studies, The University of Alabama, Tuscaloosa, Alabama, Jan. 18, 2001.

"Review of Metropolitan Nashville Airport Authority Swap and Derivatives Risks," Metropolitan Government of Nashville and Davidson County, Oct. 28, 2002.

"Broker Sets Up Muni Options Biz," Wall Street Letter, v. 36, n. 23, p. 6, Jun. 7, 2004.

"A Subtle Change in Muni Swaps: Move to Libor Points Up a Growing Shift to Becoming a Risk-Taker's Market," Investment Dealers Digest, Apr. 21, 2003.

Alex Maurice, "Connecticut HFA Test-Drives an Innovative Swap Agreement," The Bond Buyer, v. 335, n. 31095, p. 1, Mar. 13, 2001.

Elizabeth Albanese, "Houston Completes First-Ever Texas GO Swap Transaction," The Bond Buyer, v. 347, n. 31830, Feb. 27, 2004.

"Michael McDonald," Derivatives: Libor-Based Benchmarks Could Weaken Credits, S&P Says The Bond Buyer, v. 343, n. 31578, p. 6, Feb. 21, 2003.

"Hedge Funds Reap High Returns on TOBs as Treasuries Fall," Derivatives Week, v. 12, n. 3, p. 7(1), Jan. 20, 2003.

James W Lovely, et al., Fixed Spread Basis Swap: Trade Summary, Holland & Knight Public Finance, vol. 5, Issue 1, Jan. 2005, accessed at http://www.hklaw.com/content/newsletters/pubfinance/publicfinance012605.pdf.

Richard B. Stevens, et al., Derivatives for Governmental Users: Basics, Uses and Risks, Holland & Knight Public Finance, vol. 4, Issue 1, May 2004, accessed at http://www.hklaw.com/content/newsletters/pubfinance/pubfinance052404.pdf.

Han H. Lee, Interest Rate Risk—Models, Similarities and Differences, printed from http://www.financewise.com/public/edit/riskm/interestrate/interestrisk00-modelsp.htm on Sep. 1, 2005.

Swap Market Pricing, dated Dec. 6, 2004, printed from www.nast.net/treasury%20mgt/Swap%209Markert%20Pricing.ppt. on Sep. 1, 2005.

Meeting of the West Virginia Higher Education Policy Commission, Aug. 22, 2003, Marshall University Graduate College, South Charleston, West Virginia, 257 pages.

U.S. Appl. No. 11/296,611, filed Dec. 7, 2005 entitled: "Systems and Methods for Valuing a Derivative Involving a Multiplicative Index".

Non-Final Office Action mailed Sep. 3, 2008 for U.S. Appl. No. 11/296,611.

Final Office Action mailed Jun. 10, 2009 for U.S. Appl. No. 11/296,611.

Interview Summary mailed Oct. 26, 2009 for U.S. Appl. No. 11/296,611.

Non-Final Office Action mailed Jan. 21 2010 for U.S. Appl. No. 11/296,611.

Interview Summary mailed Apr. 26, 2010 for U.S. Appl. No. 11/296,611.

Interview Summary and Final Office Action mailed Sep. 30, 2010 for U.S. Appl. No. 11/296,611.

Interview Summary mailed Nov. 4, 2010 for U.S. Appl. No. 11/296,611.

Notice of Allowance mailed Dec. 6, 2010 for U.S. Appl. No. 11/296,611.

Heap, Peter, "Tax Reform Safeguards", Key for Orlando, Fla., Muni Swap, American Banter Inc., Bond Buyer v313n29728, Sep. 6, 1995, 2 pages.

Orr, Peter and Yuri Balasanov, "Models for Simulating BMA and Libor Interest Rates", Nov. 21, 2005, 2005 Intuitive Analytics, 11 pages.

\* cited by examiner

-0.026548666

SYSTEM AND METHODS FOR MODELING A MULTIPLICATIVE INDEX

PRIORITY CLAIM

This application claims the benefit of U.S. Provisional Application Ser. No. 61/032,309, filed on Feb. 28, 2008 and incorporated herein by reference.

BACKGROUND

Various embodiments are directed to systems and methods for modeling a multiplicative index, such as the BMA index. Many financial assets are valued based on indices that are multiplicative spreads over underlying indices. For example, many financial assets are valued based on the BMA Municipal Swap Index (the "BMA rate"). The BMA rate is an indicator of the market interest rate for tax-exempt municipal bonds issued by state and local governments. The BMA rate can be expressed as the appropriate London Interbank Offered Rate (the "LIBOR rate") multiplied by a ratio, which is referred to as the BMA/LIBOR ratio.

SUMMARY

In one general aspect, the present invention may be directed to computer-implemented methods for valuing a derivative based on the BMA rate. The methods may comprise generating a model of the BMA/LIBOR ratio as a function of the LIBOR index, a stochastic noise function, and a seasonality process. The methods may also comprise solving the model for at least one value of the LIBOR index, and estimating a value of the derivative given the solution of the model. The value of the derivative may then be stored.

In another general aspect, the present invention may be directed to computer-implemented methods for valuing a derivative based on the BMA rate. The methods may comprise generating a model of the BMA/LIBOR ratio as a function of the LIBOR index, a stochastic tax-regime process, and a seasonality process. The methods may also comprise solving the model for at least one value of the LIBOR index and estimating a value of the derivative given the solution of the model. Again, the value of the derivative may then be stored.

DRAWINGS

Embodiments of the present invention are described below by way of example in conjunction with the following figures, wherein.

DESCRIPTION

A multiplicative index is an economic measure, such as an interest rate, that can be expressed as an underlying index multiplied by a ratio of the multiplicative index over the underlying index. For example, the BMA rate is a multiplicative index that can be expressed as an underlying index (e.g., the LIBOR rate) times the ratio of the BMA rate over the LIBOR rate (e.g., the BMA/LIBOR ratio).

The BMA rate is roughly equal to the LIBOR rate minus a correction for the tax-exempt status of municipal bonds in the United States. Accordingly, when the top marginal tax rate in the United States is 35%, the BMA/LIBOR ratio should be approximately 65% (e.g., 100%-35%). Further, as long as the top marginal tax rate is constant, the BMA/LIBOR ratio should be constant, and the volatility of the rate should be equal to the volatility of the LIBOR rate. In practice, however, the BMA rate, and therefore the BMA/LIBOR ratio, exhibit additional dependencies and have additional sources of volatility.

For example, the BMA/LIBOR ratio exhibits a dependency on, and assumes the volatility of, the LIBOR rate, as shown by Equation (1) below:

$$\text{BMA/LIBOR}(t) = f(\text{LIBOR}(t)) \quad (1)$$

In Equation (1), t is time. When the LIBOR rate is relatively high, the BMA/LIBOR ratio exhibits a low volatility and deviates only slightly from its historical average values. On the other hand, when LIBOR is relatively low, the BMA/LIBOR ratio becomes considerably larger than its historical values and exhibits a high volatility. This phenomenon may be referred to as yield compression, and Equation (1) may be referred to as a yield compression model (YCM) function. It will be appreciated that the YCM function may be expressed as any suitable function including, for example, a polynomial function, and may be fit to historical data utilizing any suitable method including, for example, a regression method. Example methods for deriving $f(\text{LIBOR}(t))$ are disclosed in commonly assigned U.S. patent application Ser. No. 11/296,611, filed Dec. 7, 2005, which is incorporated herein by reference.

Figure 1:
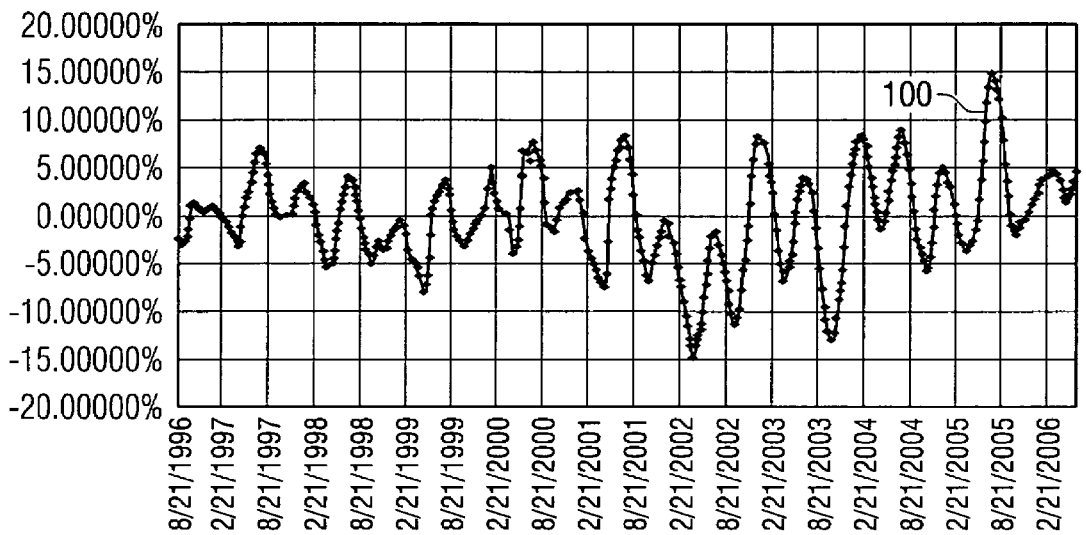
FIG. 1 illustrates one embodiment of a curve showing a three month rolling average of a deviation between a weekly BMA/LIBOR ratio and values predicted by a yield compression model (YCM) function.

In addition to yield compression, the BMA/LIBOR ratio also depends on, and derives volatility from, other factors that are independent of the LIBOR rate. For example, the BMA/LIBOR ratio may exhibit volatility due to seasonality. FIG. 1 illustrates one embodiment of a curve 100 showing a three month rolling average of a deviation between a weekly BMA/LIBOR ratio and values predicted by a YCM function, such as Equation (1) above. The curve is based on observed values of the BMA/LIBOR ratio between 1996 and 2006, which is referred to herein as the 1996-2006 data. It can be seen that the curve 100 exhibits a dependency on season. For example, local maximums and minimums of the curve 100 occur at approximately the same time of year.

According to various embodiments, this seasonal behavior may be modeled by adding a seasonality function s(t) to the form of Equation (1), as illustrated by Equation (2) below:

$$BMA/LIBOR(t)=f(LIBOR(t))+s(t) \quad (2)$$

The seasonality function s(t) may be modeled by any suitable function type including, for example, a polynomial function. A polynomial function may be fit to observed historical values in any suitable way. For example, a suitable polynomial function may be found by minimizing the squared error between the three month rolling average of deviation between the weekly BMA/LIBOR ratio and the YCM function without seasonality (e.g., curve 100), and the three month rolling average of the seasonality function.

According to various embodiments, the seasonality function may be expressed as set forth in Equation (3) below:

$$s(t) = \sum_{i=0}^{P} c_i x^i(t) \quad (3)$$

Where x(t) measures the fraction of a year between the time t and the beginning of the year including t, P is the power of the polynomial, and $C_i$ are the coefficients of the polynomial. According to various embodiments, the function s(t) may be assumed to repeat on a yearly basis. For example, s(0) may be assumed to be equal to s(1).

When the function s(t), as described by Equation (3) above, is fit to the 1996-2006 data, it was found that the decrease in squared error tends to slow for P>10. According to various embodiments, an optimal $10^{th}$ order polynomial representing the seasonality function s(t) based on the 1996-2006 data may be expressed by the coefficients shown in Table 1 below:

TABLE 1

| Coefficient | Value |
|---|---|
| $c_0$ | −0.0260 |
| $c_1$ | 0.5455 |
| $c_2$ | −32.5873 |
| $c_3$ | 296.7654 |
| $c_4$ | −951.9348 |
| $c_5$ | 1081.0700 |
| $c_6$ | 258.3131 |
| $c_7$ | −1061.1486 |
| $c_8$ | −311.0940 |
| $c_9$ | 1262.5281 |
| $c_{10}$ | −542.4610 |

Figure 2:
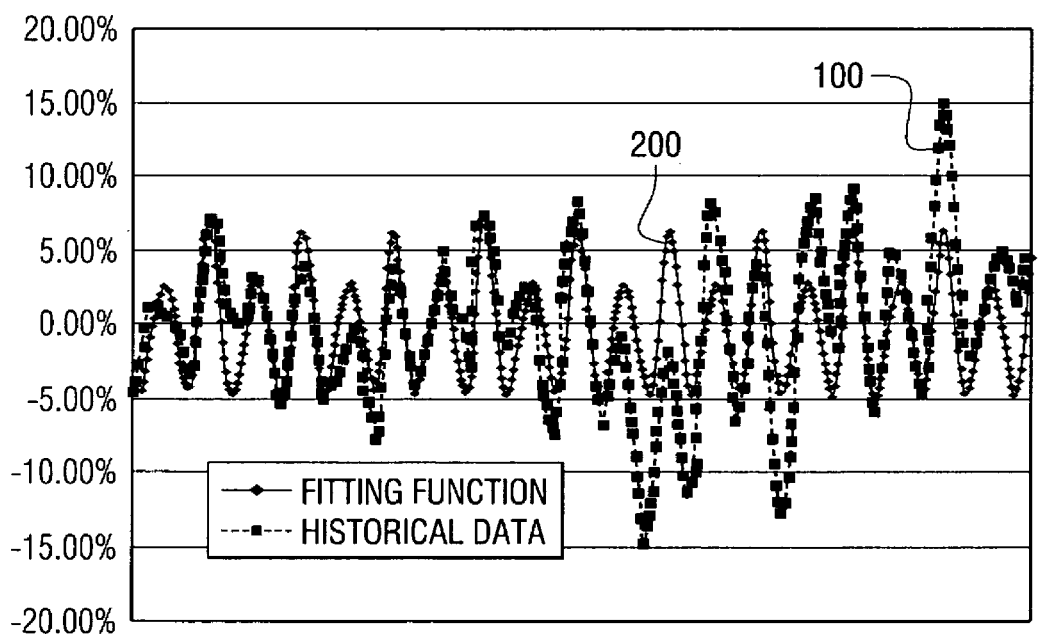
FIG. 2 illustrates one embodiment of the curve of FIG. 1 along with a curve representing a seasonality function s(t) implemented as a tenth order polynomial.

FIG. 2 illustrates one embodiment of the curve 100 along with a curve 200 representing the seasonality function s(t) implemented as a tenth order polynomial utilizing the coefficients set forth above in Table 1.

According to various embodiments, the BMA/LIBOR ratio may also exhibit additional volatility that may be modeled as a noise function N. Accordingly, the BMA/LIBOR ratio may also be expressed as shown by Equation (4) below:

$$BMA/LIBOR(t)=f(LIBOR(t))+s(t)+N \quad (4)$$

The noise function N may be selected to approximate the residuals between the observed weekly BMA/LIBOR ratio and the BMA/LIBOR ratio implied by the YCM and seasonality functions (e.g., Equation (2) above). The residuals, and hence the noise function N, may be approximated in any suitable manner. For example, the noise function N may be found utilizing independent and identically distributed (IID) random variables and/or utilizing a model that considers serial correlations that may be exhibited by N such as, for example, an Autoregressive Moving Average (ARMA) model and/or a Generalized Autoregressive Conditional Heteroskedasticity (GARCH) model. According to various embodiments, the noise function N may be stochastic, rendering Equation (4) stochastic. Equation (4) may then be solved, for example, using Monte Carlo or any other suitable methods.

Figure 3:
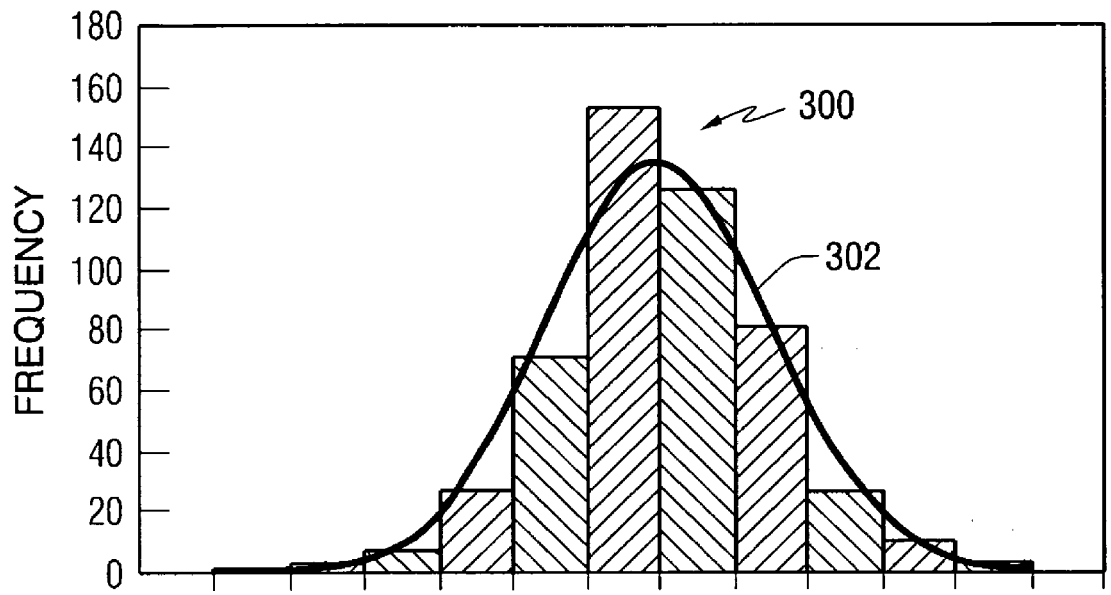
FIG. 3 illustrates one embodiment of a histogram of example residuals.
Figure 4:
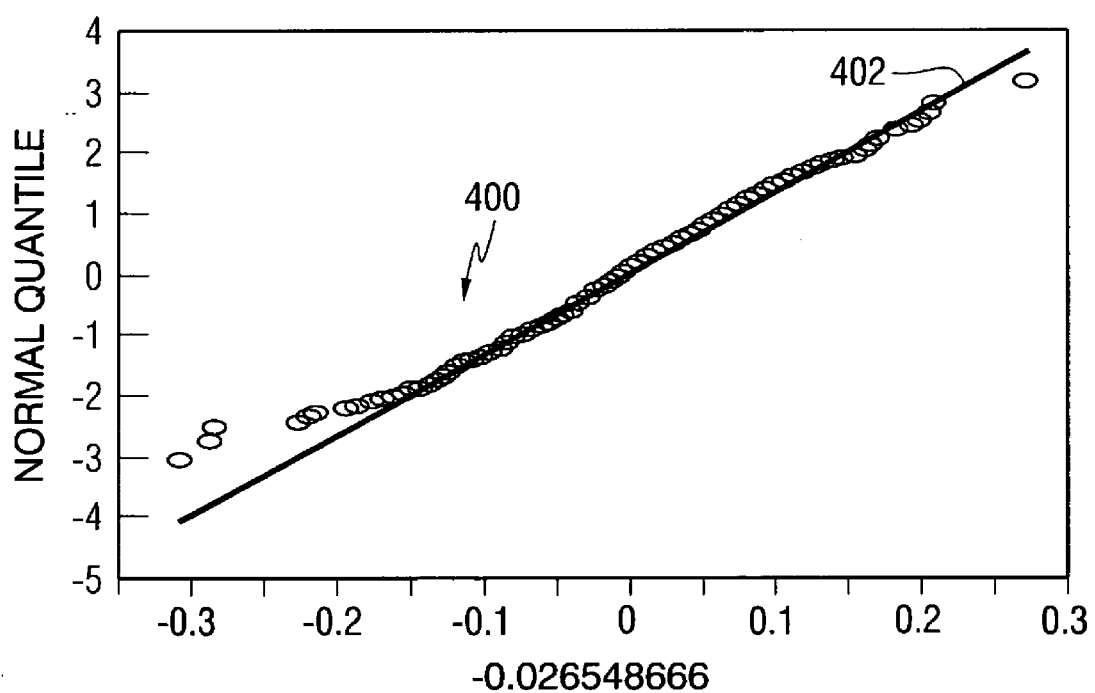
FIG. 4 illustrates one embodiment of a probability plot showing a set of points representing the example residuals of FIG. 3.

According to various embodiments, deriving the noise function N utilizing IID random variables may involve matching historical residuals to a best-fit random distribution. Although the example process below utilizes a Normal distribution, any suitable random distribution may be used including, for example, a Poisson distribution, a Binomial distribution, a Geometric distribution, a Chi-Squared distribution, etc. FIG. 3 illustrates one embodiment of a histogram 300 of example residuals based on the 1996-2006 data. A curve 302 representing a Normal distribution having the same mean as the example residuals and a first standard deviation is illustrated to demonstrate fit between the histogram 300 and a Normal distribution. The first standard deviation may be selected according to any suitable manner. For example, as shown in FIG. 3, the first standard deviation is 0.7555202. It will be appreciated that some residuals may demonstrate a better fit to another form of random distribution. FIG. 4 illustrates one embodiment of a probability plot showing a set of points 400 representing the example residuals above of FIG. 3. Line 402 represents a Normal distribution.

According to various embodiments, a best-fit Normal distribution may be found by measuring the distance between the residuals and a candidate distribution. Any suitable method may be used including, for example, a Kullback Leibler Divergence (KLD). The KLD is a natural distance measure from a true probability distribution (e.g., actual residual data) and an arbitrary probability distribution (e.g., a candidate distribution). According to various embodiments, the candidate probability distributions may be Normal distributions having the same mean as the residuals and representing a percentage of the first standard deviation (e.g., the standard deviation of the curve 302). For residuals whose histograms do not display adequate symmetry, candidate distributions having different means may also be used. Results, obtained from the example residuals, are shown by Table 2 below:

TABLE 2

| Percentage of Initial Standard Deviation | Kullback-Leibler Divergence |
|---|---|
| 110% | 0.08766 |
| 100% | 0.05636 |
| 90% | 0.05200 |
| 89% | 0.04791 |
| 88% | 0.04326 |
| 87% | 0.05075 |
| 86% | 0.06012 |
| 80% | 0.06753 |

As illustrated, the best fit standard deviation may be 88% of the initial standard deviation, or 0.6648578.

Table 3 below illustrates the results of a simulation comparing (1) the standard deviation of residuals obtained from simulating the BMA/LIBOR ratio without considering the noise function N; (2) the standard deviation of residuals obtained from simulating the BMA/LIBOR ratio considering the noise function N as calculated above; and (3) the standard deviation of the example residuals. These figures are provided for ratios modeled at one, five and ten years into the future.

TABLE 3

| | Term: | | |
|---|---|---|---|
| | 1 Year | 5 Years | 10 Years |
| Standard deviation of residuals without noise | 0.832% | 1.249% | 2.440% |
| Standard deviation of residuals with noise | 1.126% | 1.329% | 2.470% |
| Standard deviation of residuals from 1996-2006 data | 2.804% | 2.101% | 1.858% |

It can be seen that utilizing the noise function N, as derived above, may bring the modeled standard deviation closer to the actual standard deviation for shorter terms of the BMA/LIBOR ratio. For longer terms of the ratio, the Law of Large Numbers may operate to reduce the observed noise, as shown by the lessening of the standard deviation of the residuals from the 1996-2006 data. Accordingly, when modeling the BMA/LIBOR ratio over longer terms, it may be desirable to drop the noise function N from the model, or reduce its weight. Also measured during the simulation that generated Table 3, was the percentage of time when the weekly BMA/LIBOR ratio was greater than one or less than zero. The results are provided below in Table 4:

TABLE 4

| | Term | | | |
|---|---|---|---|---|
| | 1 Year | 5 Years | 10 Years | Historical |
| Percentage greater than 1 | 0% | 1.004% | 3.104% | 2.524% |
| Percentage less than 0 | 0% | 0% | 0% | 0% |

According to various embodiments, the noise function N may also be calculated utilizing a method that considers serial correlations that may be exhibited by N. For example, the noise-related volatility of the BMA/LIBOR ratio at a first point in time may depend on the value of the same volatility at one or more earlier points in time. Provided that this auto-correlation exists, it may not be captured by IID random variables. Any suitable autocorrelation method may be used, however, including, for example, an Autoregressive Moving Average (ARMA) model and/or a Generalized Autoregressive Conditional Heteroskedasticity (GARCH) model.

In general, generating an auto-correlated model of the noise function N may comprise deriving an autocorrelation function that best fits a set of observed residuals (e.g., the example residuals from the 1996-2006 data). In some embodiments, pre-estimation and post-estimation analyses may also be performed.

Pre-estimation analysis may involve applying one or more techniques to analyze a set of residuals prior to generating the best-fit auto-correlated model. For example, pre-estimation analysis may comprise plotting the residual series, examining a sample autocorrelation function (ACF), examining a partial autocorrelation function (PACF) and/or applying statistical hypothesis tests such as, for example, Engle's Autoregressive Conditional Heteroskedasticity (ARCH) test and/or the Ljung-Box-Pierce Q-Test.

Figure 5:
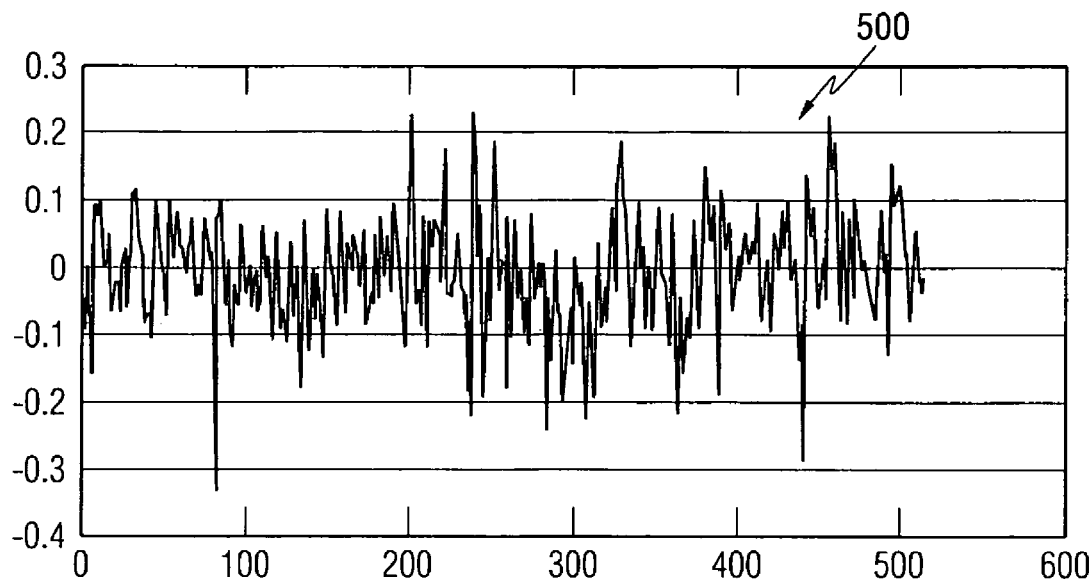
FIG. 5 illustrates one embodiment of a plot of the example residuals.
Figure 6:
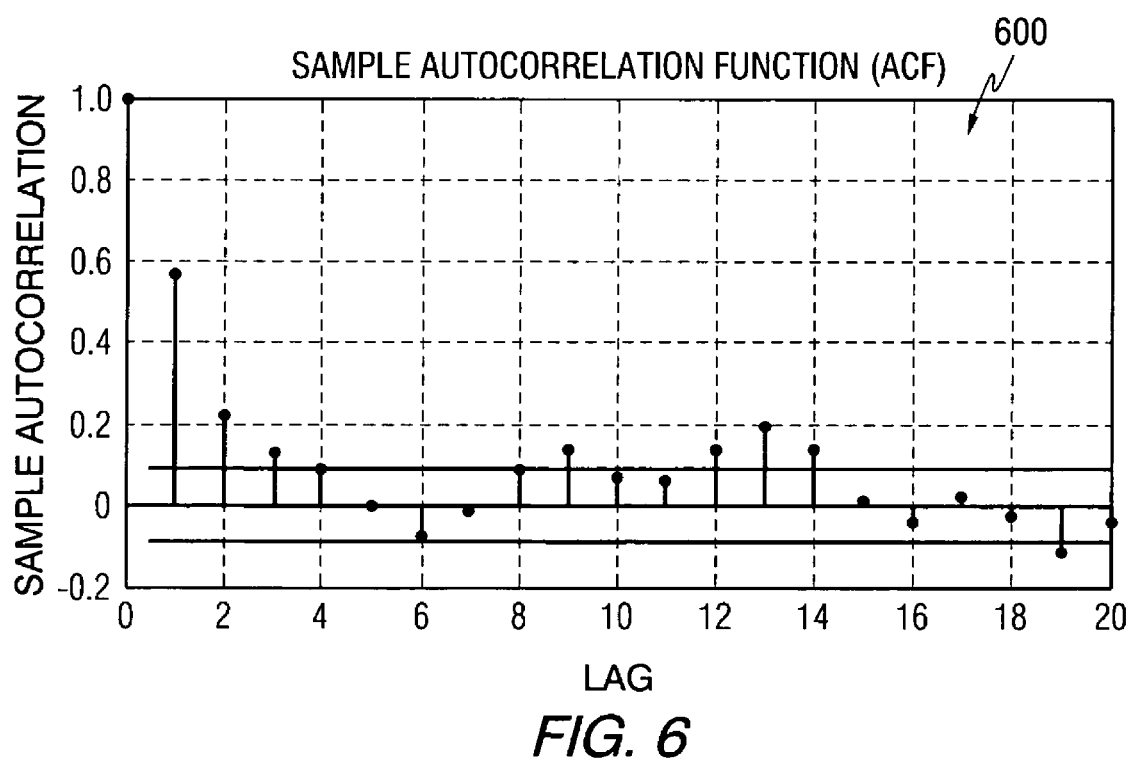
FIG. 6 illustrates one embodiment of an autocorrelation function of the example residuals of FIG. 5.
Figure 7:
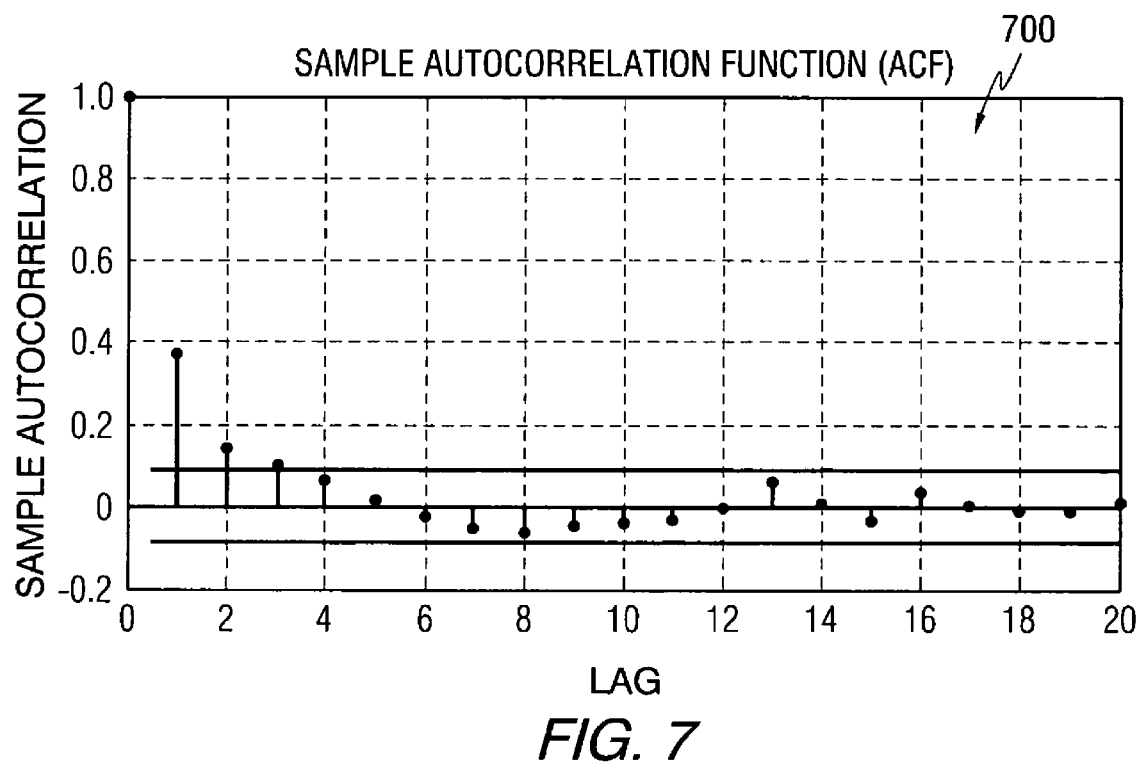
FIG. 7 illustrates one embodiment of an autocorrelation function of the example residuals of FIG. 5 squared.

FIG. 5 illustrates one embodiment of a plot 500 of the example residuals. FIG. 6 illustrates one embodiment of an autocorrelation function (ACF) 600 of the example residuals. As illustrated in FIG. 6, the ACF 600 indicates a correlation among the residuals at various lags. FIG. 7 illustrates one embodiment of an autocorrelation function 700 of the example residuals squared. The ACF 700 illustrates that, for the example residuals, there is also a correlation among the squared series as well, indicating that the variance process also shows correlation. The ACF's 600 and 700 may be generated according to any suitable method. In various embodiments, the autocorrelation function 600 may be generated utilizing the MATLAB software package.

In various embodiments, the qualitative determinations made from viewing the plot 500 and the ACF's 600 and 700 may be quantified utilizing any suitable method. For example, a Ljung-Box-Pierce Q-test procedure may be used to test for departures from randomness based on the ACF's 600 and/or 700. According to this test, a null hypothesis of no serial correlation is generated and tested. If the null hypothesis is correct, then it may be determined that the tested residuals exhibit no serial correlation. In this case, the IID random variable method for generating the noise function N may be utilized, for example, as described above. If, on the other hand, the null hypothesis is proved to be incorrect, than an auto-regressive modeling method may be used to generate the noise function N.

According to various embodiments, the null hypothesis may be that the Q-statistic derived from the Ljung-Box-Pierce Q-test is asymptotically chi-square distributed. The hypothesis may be tested according to various methods including, for example, utilizing the MATLAB software package. For example, the null-hypothesis may be tested for various lags of the ACF 600 and/or 700 (e.g., 10 lags, 15 lags, 20 lags, etc.). Results of applying the Ljung-Box-Pierce Q-test may include a Boolean decision flag indicating that the null hypothesis is either accepted or rejected (e.g., significant correlation does not or does exist). According to various embodiments, the results may also include a parameter indicating the goodness of fit between the theoretical and actual curves (e.g., a P-value), a test statistic and a critical value of the chi-square distribution of the Q statistic. It will be appreciated that the Ljung-Box-Pierce Q-test may be applied to the ACF 600 representing the autocorrelation of the tested residuals and/or the ACF 700 representing the autocorrelation of the squares of the residuals.

After pre-estimation analysis is performed, and provided that autocorrelation is found, a best-fit auto-correlation model is found for the test residuals. For example, a general ARMA model may be used, as set forth by Equation (5) below:

$$y_t = C + \sum_{i=1}^{R} \varphi_i y_{t-i} + \varepsilon_t + \sum_{j=1}^{M} \theta_j \varepsilon_{t-j} \tag{5}$$

A general GARCH model may also be used, for example, as set forth by Equation (6) below:

$$\sigma_t^2 = K + \sum_{i=1}^{P} G_i \sigma_{t-i}^2 + \sum_{j=1}^{Q} A_j \varepsilon_{t-j}^2 \tag{6}$$

According to various embodiments, the ARMA and GARCH models may be utilized together to generate an ARMA/GARCH model. The coefficients of the ARMA, GARCH and/or other models used may be found according to any suitable method. For example, the MATLAB function garchfit may be used to generate the coefficients of the best-fit GARCH model. The outputs of the function may include estimated coefficients, residuals, and a conditional standard deviation vector corresponding to the residuals.

After a best-fit model for N is generated, it may be desirable to perform post-estimation analysis to gauge the accuracy of the model. For example, the standardized residuals may be plotted, where the standardized residuals are the tested residuals divided by the conditional standard deviation vector. ACF's of the standardized residuals, and/or the squares of the standardized residuals, may be found. Also, for example, the Ljung-Box-Pierce Q-test, or a similar test, may be applied to the standardized residuals, as described above. If the standardized residuals still exhibit significant autocorrelation, then the best-fit model for N may be recalculated, for example, after increasing the number of parameters considered. For an ARMA model, this may involve incrementing R and M as set forth in Equation (5). For a GARCH model, this may involve incrementing P and Q as set forth in Equation (6).

According to various embodiments, the BMA/LIBOR ratio may exhibit dependency on and derive volatility from a tax-regime process, in addition to the noise and seasonality factors described above. The tax-regime process r may represent the possibility of abolishment and/or changes in the tax benefits enjoyed by municipal securities or other, predominantly infrequent, changes to the tax law. Considering the tax-regime process, the BMA/LIBOR ratio may be expressed as set forth by Equation (7) below:

$$BMA/LIBOR(t)=f_r(LIBOR(t))+s_r(t)+N_r. \qquad (7)$$

According to various embodiments, the tax-regime process r may be modeled as a discrete jump-process. For example, the tax-regime process may be modeled as a Markov-Chain with quarterly transitions. The states of the Markov-Chain may include a tax-exempt state at the current marginal tax rate, and an exemption-repealed state. The initial state may be the tax-exempt state. In the tax-exempt state, the various parameters of the BMA/LIBOR ratio behave as observed from historical market data. In the exemption-repealed state, the rate may be set equal to the LIBOR rate, causing the BMA/LIBOR ratio to equal one, and the seasonality and noise function, s(t) and N, to equal zero.

The transition probabilities of the Markov-Chain may be found according to any suitable method. For example, the transition probabilities may be implied from the values of one or more derivatives, such as BMA/LIBOR basis swaps. For example, with the BMA/LIBOR ratio model in the tax-exempt state, BMA/LIBOR ratio curve typically ranges from 65% to 85%. This alone will not price to par a BMA/LIBOR basis swap at ratio curve inputs. If the BMA/LIBOR ratio is assumed to be in the exemption-repealed state, however, the BMA/LIBOR basis swap may be priced to par at ratio curve inputs. Accordingly, this may allow the transition probabilities for the tax-regime process to be bootstrapped from characteristics of the BMA/LIBOR basis swap.

Equation (8) below sets forth an example BMA/LIBOR basis option that may be used to bootstrap the transition probabilities of the tax-regime process:

$$MAX(0, BMA_{3M} - 95\% \, LIBOR_{3M}) \qquad (8)$$

$BMA_{3M}$ and $LIBOR_{3M}$ may be three month BMA and LIBOR rates, respectively The option may pay quarterly if the BMA rate is greater than 95% of the LIBOR rate. Because the exempt status of municipal securities usually drives the BMA rate down to about the LIBOR rate minus the highest marginal tax rate, it is highly unlikely the option shown by Equation (8) would pay in the tax-exempt state. Accordingly, the probability of a transition to the exemption-repealed state may be backed-out of the price of the Equation (8) option. It will be appreciated that, for purposes of this analysis, the Equation (8) option may be replaced by any option or group of options depending on whether a difference between the rate and the LIBOR rate that is less than the current top marginal rate.

Models of the rate and/or the BMA/LIBOR ratio developed as described herein may be used for various purposes including, for example, to generate predicted values of derivatives that depend on the BMA rate and/or the BMA/LIBOR ratio. Also, the models may be used, in turn, as components of models for derivatives that are based on the BMA rate and/or the BMA/LIBOR ratio.

Several sources of dependence and volatility for the BMA/LIBOR ratio are described above including, for example, a seasonality function s(t), a noise function N and a tax-regime process, r. Any combination of these sources may be used to model the BMA/LIBOR ratio. The sources used in any given model may depend on its intended use. For example, when the model is used to estimate the value of a short-term derivative, the tax-regime process r may be excluded. This is because the chances of a change in the tax-regime in the short term may be relatively small, which may render the tax-regime process r insignificant. When the model is used to estimate the value of a long-term derivative, the tax-regime process r may be included. This is because as the term of a derivative increases, the chances of some sort of change in the tax-regime during that term also increase, increasing the significance of the tax-regime process r. The noise function N may or may not be included in a model for estimating the value of a long-term derivative. As described above, the significance of the noise function N may decrease as term increases, due to the Law of Large Numbers.

Generally, derivatives having a strike date less than one year into the future may be considered short term derivatives, while derivatives having a strike date more than one year into the future may be considered long term derivatives. According to various embodiments, however, the distinction between long and short term derivatives may change based on anticipated events. A scheduled election, administrative action, or other event that could have an effect on the tax-regime may constitute an alternate breakpoint between long and short term derivatives. For example, when such an event is near, derivatives having strike dates before the event may be considered short term, while derivatives having strike dates after the event may be considered long term.

Figure 8:
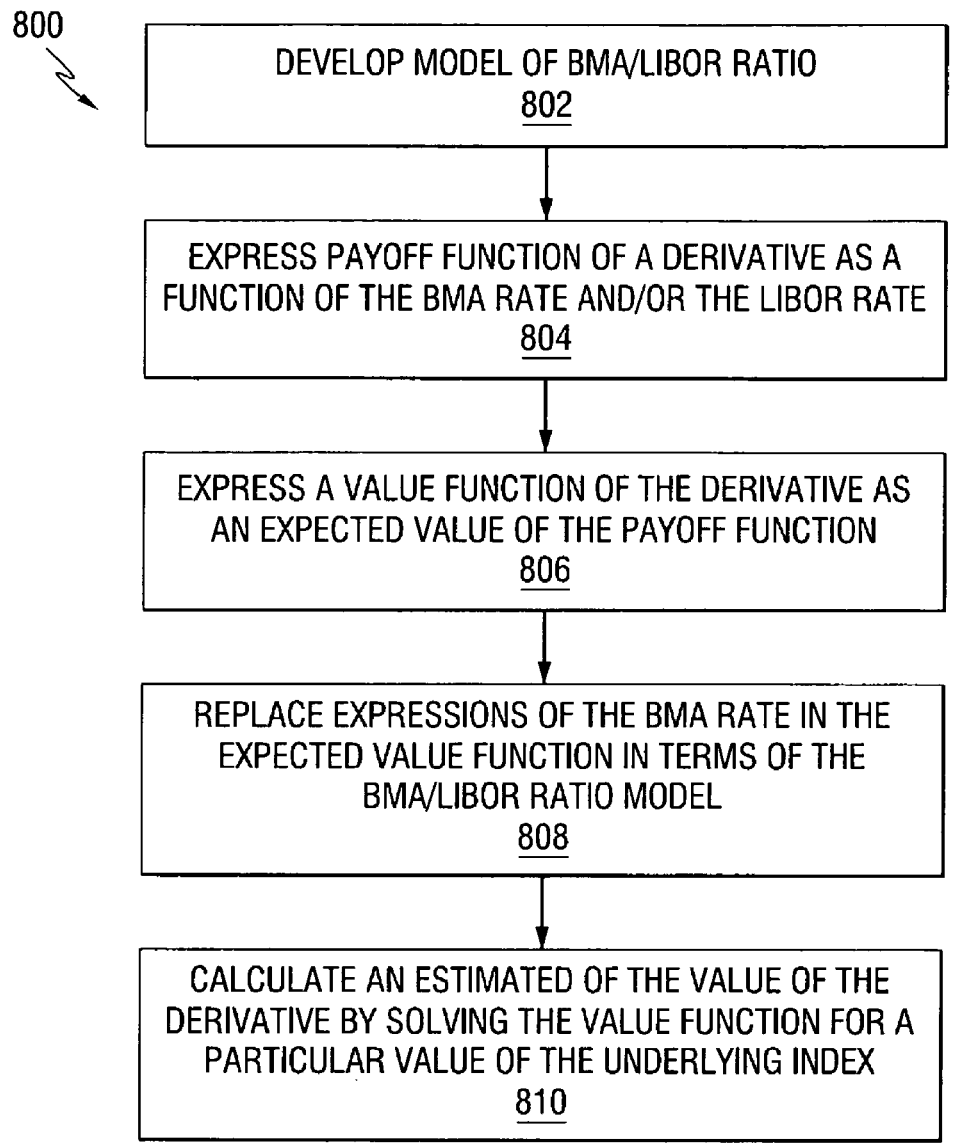
FIG. 8 illustrates one embodiment of a process flow showing a method for estimating modeling the value of a derivative utilizing a model of the BMA/LIBOR ratio.

FIG. 8 illustrates one embodiment of a process flow 800 showing a method for modeling the value of a derivative utilizing a model of the BMA/LIBOR ratio. At box 802, the BMA/LIBOR ratio model may be developed. For example, the BMA/LIBOR ratio model may be derived as described above. The terms of the model may be selected, for example, based on the nature of the derivative. If the derivative is a short term derivative then the noise function N may be included while the tax-regime process r may be excluded. If the derivative is a long term derivative having a long term strike date (e.g., 10 years, 15 years, etc.), then the tax-regime process r may be included. For both long and short term derivatives, the seasonality function s(t) may be included or excluded based on various factors including, for example, desired accuracy and processing capacity.

At box 804, a payoff function of the derivative may be expressed. The payoff function may be a function of the BMA rate, for example, as illustrated by Equation (9) below:

$$P(BMA(t)) \qquad (9)$$

It will be appreciated that the form of the payoff function may vary depending on factors including, for example, the type of derivative being modeled.

At box 806, a value of the derivative, V(t), may be expressed. The value V(t) may be the expected value of the derivative's payoff function, as shown in Equation 10 below:

$$V(t)=E[P(\text{BMA}(t))] \qquad (10)$$

As shown in Equation 10, V(t) is a function of the BMA rate. At box 808, expressions of the BMA rate in the value function V(t) may be replaced in terms of the BMA/LIBOR ratio model found at box 802. At box 810, an estimated value of the derivative may be found by solving the value function V(t) for a particular value of the LIBOR rate. This may involve evaluating the model of the BMA/LIBOR ratio. Because one or more terms of the BMA/LIBOR ratio model may be stochastic (e.g., N and/or r), this may also involve running a plurality of Monte Carlo simulations of the BMA/LIBOR ratio model. The estimated value may then be stored, which may include, for example, storing the estimated value to a database, such as database 1010 described below, transmitting the estimated value to a second computer system, storing the estimated value to a data store (e.g., a memory, a disk, or any other temporary or permanent location), transmitting to an end user, displaying the estimated value on a user interface, etc.

Figure 9:
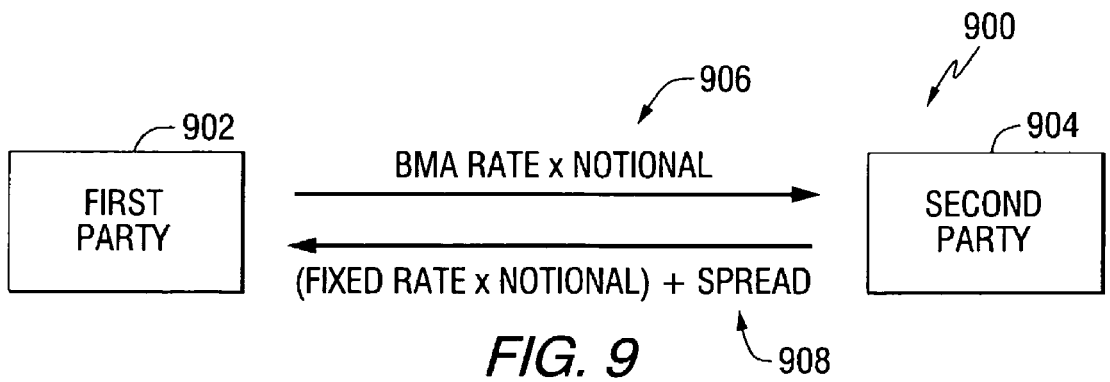
FIG. 9 illustrates one embodiment of an example derivative between a first party and second party based on the BMA rate.

Derivative values calculated utilizing the BMA/LIBOR ratio modeling techniques described herein may be used by various parties to the derivatives as well as others interested in the derivatives, including analysts, regulators, financial engineers, etc. FIG. 9 illustrates one embodiment of an example derivative 900 between a first party 902 and second party 904 based on the BMA rate. Under a first leg 906 of the derivative 900, the first party 902 pays the second party 904 the BMA rate times a notional amount. Under a second leg 908, the second party 904 pays first party 902 a fixed rate times the notional amount.

According to various embodiments, a financial engineer, or other derivative designer, may use the derivative values found utilizing the BMA/LIBOR ratio modeling techniques described herein to design a derivative, which may then be marketed. For example, using the derivative 900 as an example, the financial engineer may use BMA/LIBOR ratio modeling techniques, for example, as described by the process flow 800, to find the net payout of the derivative 900 for values of LIBOR expected during the term of the derivative 900. Based on the results, the financial engineer may choose and/or modify a value for the fixed rate of leg 908 to bring about desired net payout characteristics. For example, the financial engineer may set the fixed rate so that net payout of the derivative for expected values of LIBOR is zero. The financial engineer may also set the fixed rate so that the net payout of the derivative favors first party 902 or second party 904.

Other parties interested in a derivative, such as, for example, derivative 900, may also use derivative values found utilizing the BMA/LIBOR ratio modeling techniques described herein to determine the risk associated with the derivative and find an adequate hedge. For example, referring to the derivative 900, the first party 904 has a short position on the BMA rate. The obvious hedge would be for the first party 904 to enter a derivative giving it a long position on the BMA rate. Such a hedge may not be available, though. Accordingly, the first party 904 may use the derivative values found utilizing the BMA/LIBOR ratio modeling techniques described herein to find its risk associated with derivative 900 in terms of the LIBOR rate. For example, knowing the payout of the derivative 900 for various values of LIBOR may allow the first party 904 to hedge the derivative 900 with a second, more readily available derivative based on the LIBOR rate.

Figure 10:
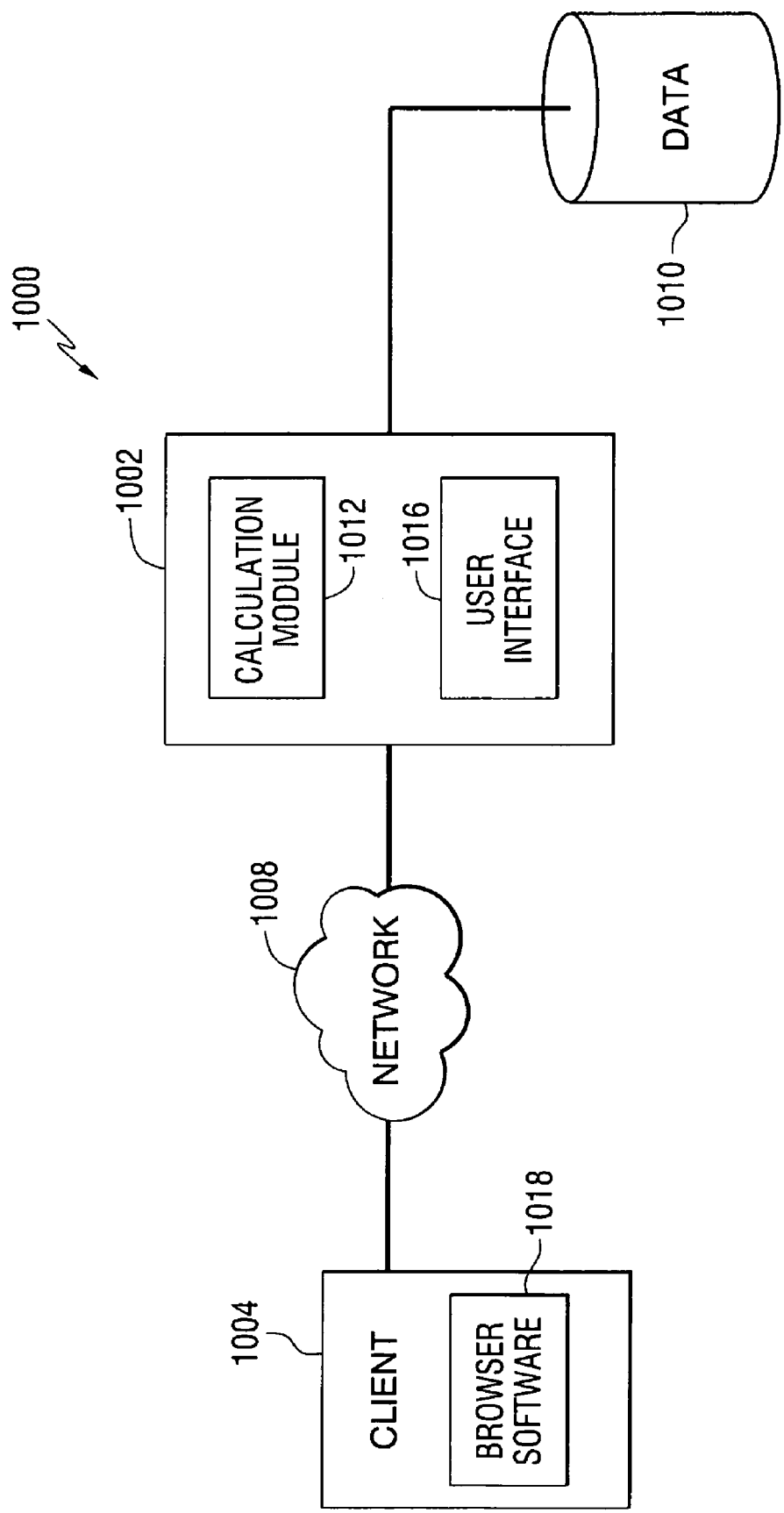
FIG. 10 shows a diagram of one embodiment of a system for modeling the BMA/LIBOR ratio and finding values of derivatives based on the BMA rate.

FIG. 10 shows a diagram of one embodiment of a system 1000 for modeling the BMA/LIBOR ratio and finding values of derivatives based on the BMA rate. The system 1000 includes a computer 1002, which may be in communication with a database 1010. The computer 1002 may receive input from and provide results to one or more client computers 1004 via a network 1008. The network 1008 may be any kind of wired or wireless network.

The computer 1002 itself may include modules 1012, 1016 for performing tasks related to modeling the multiplicative index. The various modules 1012, 1016 of the computer system 1002 may be implemented as software code to be executed by a processor or processors of the computer 1002 or any other computer system using any suitable computer instruction type. The software code may be stored as a series of instructions or commands on a computer readable medium. In various embodiments, the computer 1002, through modules 1012, 1016, may perform some or all of the respective steps for generating models of the BMA/LIBOR ratio, applying models of the BMA/LIBOR ratio and/or valuing derivatives.

The calculation module 1012 may perform various processing steps necessary to generate models of BMA/LIBOR ratio and derivatives based thereon. In various embodiments, the calculation module 1012 may prompt the client computer 1004 to select the type of model to be developed. For example, the calculation module 1012 may generate a model of the BMA/LIBOR ratio, a direct model of the value of a derivative, and/or any other economic parameter based on the BMA rate. In instances where the calculation module 1012 is to directly model the value of a derivative, it may additionally prompt the client computer 1004 for the type of derivative to be modeled. An equation representing the payoff and/or value of the derivative may then be acquired, for example, from database 1010. In various non-limiting embodiments, the computer 1002 may prompt the client computer 1004 for an equation representing the payoff and/or value function of the derivative.

The calculation module 1012 may also prompt the client computer 1004 to select the function or functions that the model will utilize, or may determine the optimal functions to be used based on known factors. For example, if the calculation module 1012 is modeling a short term derivative, it may include the noise function N and seasonality function s(t), but may exclude the tax-regime process r. The calculation module 1012 may also derive parameters or coefficients for equations included in the models it develops by comparing the models to historical values of the and LIBOR rates. The historical values may, in various embodiments, be stored at database 1010.

The calculation module 1012 may also apply the developed models to generate estimates of economic parameters including, for example, the BMA rate, values of derivatives based on the BMA rate, etc. In various embodiments, the calculation module 1012 may receive inputs including, for example, a value (e.g., a current value, expected value, etc.) of the LIBOR rate. These inputs may be received from the client computer 1004, or in various embodiments, may be received from database 1010. The calculation module 1012 may apply models by solving one or more equations given the value of the underlying index. When one or more stochastic terms are included in a model, as described above, the calculation module 1012 may utilize Monte Carlo methods to apply the model. Results of models generated by the calculation module 1012 may be stored, for example, as described above.

According to various embodiments, the calculation module 1012 may also be configured to develop parameters of derivatives, hedges for given positions, or other functions, for example, as described above. Results of these actions may also be stored.

The system 1000 may also include a user interface module 1016. The user interface module 1016 may provide a user interface to the client computer 1004. A user of the client computer may access the user interface, for example, using browser software 1006. The user interface may provide output to the client computer 1004 including, for example, the general form of models and the results of estimates generated by the calculation module 1012. The user interface generated by the user interface module 1016 may also solicit input from the client computer 1004 including, for example, type of model to be generated, the type of derivative to be modeled, the type of function(s) to use in the model, etc. It will be appreciated that in various non-limiting embodiments, the computer 1002 itself may include input and output devices (e.g., a monitor, keyboard, mouse, etc.) for providing a user interface.

It is to be understood that the figures and descriptions of the present invention have been simplified to illustrate elements that are relevant for a clear understanding of the present invention, while eliminating, for purposes of clarity, other elements, such as, for example, details of the software for implementing the various modules 1012, 1016. However, because such elements are well known in the art and because they do not facilitate a better understanding of the present invention, a discussion of such elements is not provided herein.

As used herein, a "computer" or "computer system" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for stand-alone application and/or over a networked medium or media. Computers and computer systems disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

While several embodiments of the invention have been described, it should be apparent that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

I claim:

1. A computer-implemented method for valuing a derivative based on a first rate indicating interest paid on tax-exempt instruments, the method comprising:
generating, by a computer, a model of a ratio of the first rate over a second rate as a function of:
the second rate, wherein the second rate indicates interest paid on taxed instruments,
a stochastic noise function, and
a seasonality process, wherein the computer comprises at least one processor and operatively associated memory, wherein the model is expressed as:

$$BMA/LIBOR = f(LIBOR(t)) + N + s(t)$$

wherein BMA/LIBOR is the ratio;
wherein LIBOR is the second rate;
wherein s(t) is the seasonality process; and
wherein N is the stochastic noise function;
generating a solution of the model, by the computer, for at least one value of the second rate; and
estimating, by the computer, a value of the derivative given the solution of the model.

2. The method of claim 1, wherein the derivative is a short-term derivative.

3. The method of claim 1, wherein s(t) is a polynomial expressed as:

$$s(t) = \sum_{i=0}^{P} c_i x^i(t)$$

wherein P is the order of the polynomial;
wherein c is a constant; and
wherein $x^i(t)$ represents a fraction of a year between the time t and the beginning of a year including t.

4. The method of claim 3, wherein P is greater than or equal to ten.

5. The method of claim 4, wherein P is equal to 10, and wherein $c_0 = -0.0260$; $c_1 = 0.5455$; $c_2 = -32.5873$; $c_3 = 296.7654$; $c_4 = -951.9348$; $c_5 = 1081.07$; $c_6 = 258.3131$; $c_7 = -1061.1486$; $c_8 = -311.0940$; $c_9 = 1262.5281$; and $c_{10} = -542.4610$.

6. The method of claim 3, wherein s(0)=s(1).

7. The method of claim 1, wherein the stochastic noise function is expressed as a function of independent and identically distributed (IID) random variables.

8. The method of claim 7, wherein the stochastic noise function is expressed as a Normal distribution.

9. The method of claim 8, wherein the Normal distribution is a best-fit distribution with a set of residuals between observed values of the ratio and the ratio generated by the model without considering the stochastic noise function.

10. The method of claim 1, wherein the stochastic noise function is expressed utilizing an auto-correlated model of a set of residuals between observed values of the ratio and the ratio generated by the model without considering the stochastic noise function.

11. The method of claim 10, wherein the auto-correlated model comprises a model selected from the group consisting of an Autoregressive Moving Average (ARMA) model; a Generalized Autoregressive Conditional Heteroskedasticity (GARCH) model; and a combination of an ARMA model and a GARCH model.

12. The method of claim 1, wherein the model is also a function of a stochastic tax-regime process.

13. The method of claim 12, wherein the stochastic tax-regime process comprises a jump-process model.

14. The method of claim 12, wherein the stochastic tax-regime process comprises a Markov-Chain with quarterly transitions, wherein the Markov-Chain comprises a first tax-exempt state and a second exemption-repealed state.

15. The method of claim 14, further comprising determining at least one transition probability of the Markov-Chain considering a value of a derivative based on at least one factor selected from the group consisting of the first rate and the ratio.

16. The method of claim 15, wherein the derivative pays when a difference between the first rate and the second rate is less than a top marginal tax rate.

17. A system for valuing a derivative based on a first rate indicating interest paid on tax-exempt municipal bonds, the system comprising at least one computer comprising at least one processor and operatively associated memory, wherein the memory comprises instructions that, when executed by the processor, causes the computer to:
generate a model of a ratio of the first rate over a second rate as a function of:
the second rate, wherein the second rate indicates interest paid on taxed instruments,
a stochastic noise function, and
a seasonality process, wherein the model is expressed as:

$$BMA/LIBOR = f(LIBOR(t)) + N + s(t)$$

wherein BMA/LIBOR is the ratio;
wherein LIBOR is the second rate;
wherein s(t) is the seasonality process; and
wherein N is the stochastic noise function;
generate a solution of the model for at least one value of the second rate; and
estimate a value of the derivative given the solution of the model.

18. A computer readable storage medium having instructions thereon that when executed by at least one processor cause the at least one processor to:
generate a model of a ratio of a first rate over a second rate as a function of:
the second rate, wherein the second rate indicates interest paid on taxed instruments and the first rate indicates interest paid on tax-exempt instruments,
a stochastic noise function, and
a seasonality process, wherein the model is expressed as:

$$BMA/LIBOR = f(LIBOR(t)) + N + s(t)$$

wherein BMA/LIBOR is the ratio;
wherein LIBOR is the second rate;
wherein s(t) is the seasonality process; and
wherein N is the stochastic noise function;
generate a solution of the model for at least one value of the second rate; and
estimate a value of the derivative given the solution of the model, wherein the medium is a computer storage medium.

19. A computer-implemented method for valuing a derivative based on a first rate indicating interest paid on tax-exempt instruments, the method comprising:
generating, by a computer, a model of a ratio of the first rate over a second rate as a function of:
the second rate, wherein the second rate indicates interest paid on taxed instruments,
a stochastic tax-regime process, and
a seasonality process, wherein the computer comprises at least one processor and operatively associated memory, wherein the model is expressed as:

$$BMA/LIBOR = f_r(LIBOR(t)) + s_r(t)$$

wherein BMA/LIBOR is the ratio;
wherein LIBOR is the second rate;
wherein s(t) is the seasonality process; and
wherein r is the stochastic tax-regime process;
generating a solution of the model, by the computer, for at least one value of the second rate;
estimating, by the computer, a value of the derivative given the solution of the model.

20. The method of claim 19, wherein the derivative is a long-term derivative.

21. The method of claim 19, wherein the stochastic tax-regime process comprises a jump-process model.

22. The method of claim 19, wherein the stochastic tax-regime process comprises a Markov-Chain with quarterly transitions, wherein the Markov-Chain comprises a first tax-exempt state and a second exemption-repealed state.

23. The method of claim 22, further comprising determining at least one transition probability of the Markov-Chain considering a value of a derivative based on at least one factor selected from the group consisting of the first rate and the ratio.

24. The method of claim 19, wherein the model is also a function of a noise function.

25. The method of claim 24, wherein the noise function is a stochastic noise function expressed as a function of independent and identically distributed (IID) random variables.

26. The method of claim 25, wherein the stochastic noise function is expressed utilizing an auto-correlated model of a set of residuals between observed values of the ratio and the ratio generated by the model without considering the stochastic noise function.

27. A system for valuing a derivative based on the BMA rate, the system comprising at least one computer comprising at least one processor and operatively associated memory, wherein the memory comprises instructions that, when executed by the processor, causes the computer to:
generate a model of a ratio of the first rate over a second rate as a function of:
the second rate, wherein the second rate indicates interest paid on taxed instruments,
a stochastic tax-regime process, and
a seasonality process, wherein the model is expressed as:

$$BMA/LIBOR = f_r(LIBOR(t)) + s_r(t)$$

wherein BMA/LIBOR is the ratio;
wherein LIBOR is the second rate;
wherein s(t) is the seasonality process; and
wherein r is the stochastic tax-regime process;
generate a solution to the model for at least one value of the second rate; and
estimate a value of the derivative given the solution of the model.

28. A computer readable storage medium having instructions thereon that when executed by at least one processor cause the at least one processor to:
generate a model of a ratio of the first rate over a second rate as a function of:
the second rate, wherein the second rate indicates interest paid on taxed instruments,
a stochastic tax-regime process, and
a seasonality process, wherein the model is expressed as:

$$BMA/LIBOR = f_r(LIBOR(t)) + s_r(t)$$

wherein BMA/LIBOR is the ratio;
wherein LIBOR is the second rate;
wherein s(t) is the seasonality process; and
wherein r is the stochastic tax-regime process;
generate a solution to the model for at least one value of the second rate; and
estimate a value of the derivative given the solution of the model, wherein the medium is a computer storage medium.

29. The method of claim 1, wherein the first rate is based on the BMA Municipal Swap Index and the second rate is based on a London Interbank Exchange (LIBOR) rate.

30. The method of claim 19, wherein the first rate is based on the BMA Municipal Swap Index and the second rate is based on a London Interbank Exchange (LIBOR) rate.

* * * * *

UNITED STATES PATENT AND TRADEMARK OFFICE
CERTIFICATE OF CORRECTION

PATENT NO.        : 8,255,302 B2  
APPLICATION NO.   : 12/082280  
DATED             : August 28, 2012  
INVENTOR(S)       : Mike Chen Page 1 of 1

It is certified that error appears in the above-identified patent and that said Letters Patent is hereby corrected as shown below:

Column 12, Line 42 delete "$c_8=285.3131$" and substitute --$c_6=285.3131$--

Signed and Sealed this  
Twenty-seventh Day of November, 2012

David J. Kappos  
*Director of the United States Patent and Trademark Office*